United States Patent
Vuong (10) Patent No.: US 8,675,023 B2
(45) Date of Patent: Mar. 18, 2014

(54) METHOD AND APPARATUS FOR CONTROLLING A DISPLAY

(75) Inventor: Thanh Vinh Vuong, Kitchener (CA)

(73) Assignee: BlackBerry Limited, Waterloo (CA)

( * ) Notice: Subject to any disclaimer, the term of this patent is extended or adjusted under 35 U.S.C. 154(b) by 699 days.

(21) Appl. No.: 12/878,200

(22) Filed: Sep. 9, 2010

(65) Prior Publication Data

US 2012/0062601 A1   Mar. 15, 2012

(51) Int. Cl.
*G09G 5/00*   (2006.01)

(52) U.S. Cl.
USPC ............................................. 345/661

(58) Field of Classification Search
USPC ............................................. 345/661
See application file for complete search history.

(56) References Cited

U.S. PATENT DOCUMENTS

| | | | |
|---|---|---|---|
| 5,754,809 A * | 5/1998 | Gandre | 715/782 |
| 5,889,517 A | 3/1999 | Ueda et al. | |
| 2005/0172238 A1* | 8/2005 | Miksovsky et al. | 715/762 |
| 2007/0250787 A1* | 10/2007 | Kawahara et al. | 715/782 |
| 2008/0168396 A1 | 7/2008 | Matas et al. | |
| 2009/0005072 A1 | 1/2009 | Forstall et al. | |
| 2009/0177385 A1 | 7/2009 | Matas et al. | |
| 2009/0227279 A1* | 9/2009 | Yuki et al. | 455/550.1 |
| 2009/0298545 A1* | 12/2009 | Kittel et al. | 455/566 |
| 2010/0081475 A1 | 4/2010 | Chiang et al. | |
| 2010/0088634 A1* | 4/2010 | Tsuruta et al. | 715/800 |
| 2010/0123737 A1* | 5/2010 | Williamson et al. | 345/672 |
| 2010/0214278 A1 | 8/2010 | Miura | |
| 2011/0252368 A1* | 10/2011 | Anzures et al. | 715/823 |

FOREIGN PATENT DOCUMENTS

| | | |
|---|---|---|
| EP | 2023335 A2 | 2/2009 |
| EP | 2073517 A1 | 6/2009 |
| EP | 2219354 A2 | 8/2010 |

OTHER PUBLICATIONS

European Patent Application No. 10 17 6005.6 Extended Search Report mailed May 10, 2011.
Ray, Bill, "Microsoft re-tiles mobile platform for Windows 7 era get excited now! Or in a few months" (Feb. 15, 2010), online: The Register <http://www.theregister.co.uk/2010/02/15/windows_phone_7_series/print.html>.
Arghire, Ionut, "Windows Phone 7 Video Demos Emerge" (Mar. 8, 2010), online: Softpedia <http://news.softpedia.com/news/Windows-Phone-7-Video-Demos-Emerge-136808.shtml>.
"Using Yubnub's Split command to multitask on an IPhone and mobile Safari Options" (Aug. 21, 2009), online: Youse, <http://youse.wordpress.com/2009/08/21/using-split-command-to-multitask-on-an-iphone-and-mobile-safari-options/>.

(Continued)

*Primary Examiner* — Jeffrey Chow
(74) *Attorney, Agent, or Firm* — Perry + Currier Inc.; Kristjan Spence (57) ABSTRACT

According to embodiments described in the specification, a method and apparatus for controlling a display are provided. The method comprises providing a first interface on the display, the first interface comprising a representation of a first application at a default zoom level; receiving a command to launch a second application; and, responsive to receiving the launch command, providing an updated interface on the display, the updated interface comprising updated representations of the first application and the second application; wherein the updated representation of the first application is inactive and occupies a first portion of the area of the display, and the updated representation of the second application is active and occupies a second portion of the display area, the second portion being larger than the first portion.

18 Claims, 8 Drawing Sheets

(56) References Cited

OTHER PUBLICATIONS

New CNN, Skype, Mytopia and 'On the Road' panels introduced for the Xperia (Feb. 16, 2009), online: Sony Ericsson, <http://www.sonyericsson.com/cws/corporate/press/pressreleases/pressreleasedetails/x1panelpressreleasefinal-20090216>.

Miniman, Brandon, "Sony ericsson XPERIA X1 Panel Tour" (Oct. 31, 2008), online: Pocketnow <http://pocketnow.com/hardware-1/sony-ericsson-xperia-x1-panel-tour>.

"Stupid Geek Tricks: Tile or Cascade Multiple Windows in Windows 7" (Feb. 11, 2010), online: How-to Geek, <http://www.howtogeek.com/howto/11073/stupid-geek-tricks-tile-or-cascade-multiple-windows-in-windows-7/>.

Krzit, Tom, "Can a Palm Pre multitask better than an IPhone?" (May 6, 2009), online: cnet news <http://news.cnet.com/8301-1035_3-10234043-94.html>.

European Patent Application No. EP 10 17 6005.6 Partial Search Report dated Jan. 28, 2011.

Corresponding European Patent Application No. 10176005.6 Summons to attend oral proceedings pursuant to Rule 115(1) EPC dated Aug. 12, 2013.

\* cited by examiner

METHOD AND APPARATUS FOR CONTROLLING A DISPLAY

FIELD

The specification relates generally to mobile electronic devices, and specifically to a method and apparatus for controlling the display of a mobile electronic device.

BACKGROUND

Personal computers and similar electronic devices have long had the ability to "multitask"—to execute multiple separate applications, each providing different functionality, simultaneously. Such devices can also have large displays capable of readily presenting several applications at once. Mobile electronic devices such as smart phones and cellular phones are limited not only in terms of display area, but also in terms of computational resources. Thus, multitasking on such mobile devices remains inefficient and inconvenient.

BRIEF DESCRIPTIONS OF THE DRAWINGS

Embodiments are described with reference to the following figures, in which.

DETAILED DESCRIPTION OF THE EMBODIMENTS

According to an aspect of the specification, a method of controlling a display of a mobile electronic device is provided, comprising providing a first interface on the display, the first interface comprising a representation of a first application at a default zoom level; receiving a command to launch a second application; and, responsive to receiving the launch command, providing an updated interface on the display, the updated interface comprising updated representations of the first application and the second application; wherein the updated representation of the first application is inactive and occupies a first portion of the area of the display, and the updated representation of the second application is active and occupies a second portion of the display area, the second portion being larger than the first portion.

According to another aspect of the specification, a mobile electronic device is provided, comprising a display; a memory for maintaining a first application and a second application; and a processor interconnected with the display and the memory, the processor configured to control the display for providing a first interface, the first interface comprising a representation of the first application at a default zoom level; the processor further configured to receive a command to launch the second application; the processor further configured, responsive to receiving the launch command, to control the display for providing an updated interface, the updated interface comprising updated representations of the first application and the second application; wherein the updated representation of the first application is inactive and occupies a first portion of the area of the display, and the updated representation of the second application is active and occupies a second portion of the display area, the second portion being larger than the first portion.

According to a further aspect of the specification, a non-transitory computer readable storage medium having computer-readable instructions embodied therein for execution by a processor is provided. The computer-readable instructions implement a method comprising providing a first interface on the display, the first interface comprising a representation of a first application at a default zoom level; receiving a command to launch a second application; and, responsive to receiving the launch command, providing an updated interface on the display, the updated interface comprising updated representations of the first application and the second application; wherein the updated representation of the first application is inactive and occupies a first portion of the area of the display, and the updated representation of the second application is active and occupies a second portion of the display area, the second portion being larger than the first portion.

Figure 1:
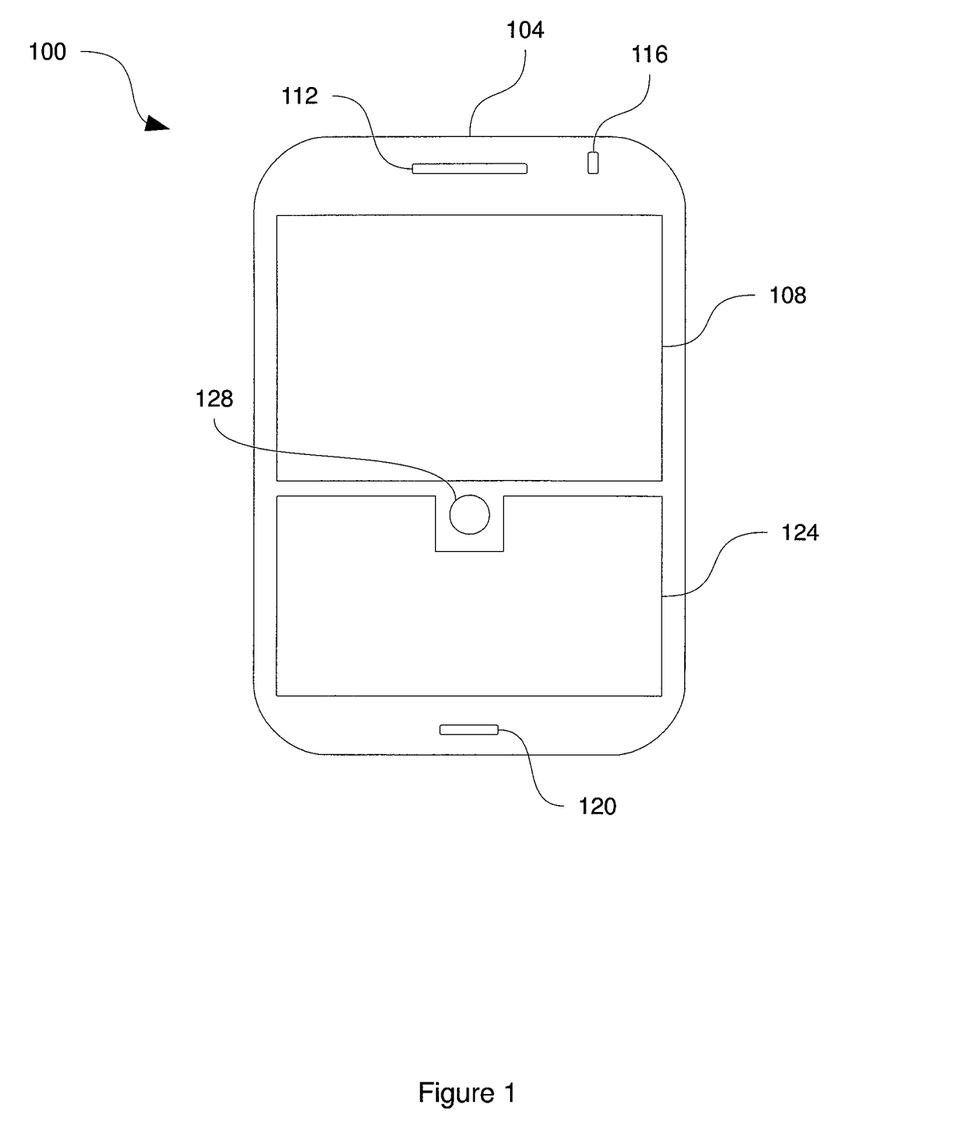
FIG. 1 depicts a mobile electronic device, according to a non-limiting embodiment.

FIG. 1 depicts a mobile electronic device 100, which in the present embodiment is based on the computing environment and functionality of a hand-held wireless communication device. It will be understood, however, that mobile electronic device 100 is not limited to a hand-held wireless communication device. Other mobile electronic devices are also contemplated, such as cellular telephones, smart telephones, Personal Digital Assistants ("PDAs"), media or MP3 players, laptop computers and the like.

Mobile electronic device 100 includes a housing 104 which supports the various other components of mobile electronic device 100. Housing 104 can be constructed of any suitable material, or combination of materials, including without limitation plastics (e.g. Polycarbonate/Acrylonitrile Butadiene Styrene ("PC/ABS")) and metals (e.g. aluminum).

Mobile electronic device 100 can also include one or more output devices, including without limitation a display 108, a speaker 112 and a Light Emitting Diode ("LED") indicator 116. Mobile electronic device 100 additionally includes one or more input devices, including without limitation a microphone 120, a keypad 124 (which, in some non-limiting embodiments, can include a QWERTY keyboard and one or more additional function keys) and a trackball 128. It will now be apparent that in some embodiments (not shown), other combinations of input and output devices can be provided. In some non-limiting embodiments, trackball 128 can be replaced with a touchpad (not shown). In further non-limiting embodiments, one or both of keypad 124 and trackball 128 can be omitted, and a touch screen input device can be integrated with display 108. In still other embodiments, the touch screen input device can be provided in addition to keypad 124 and trackball 128. Further combinations and variations will occur to those skilled in the art.

Figure 2:
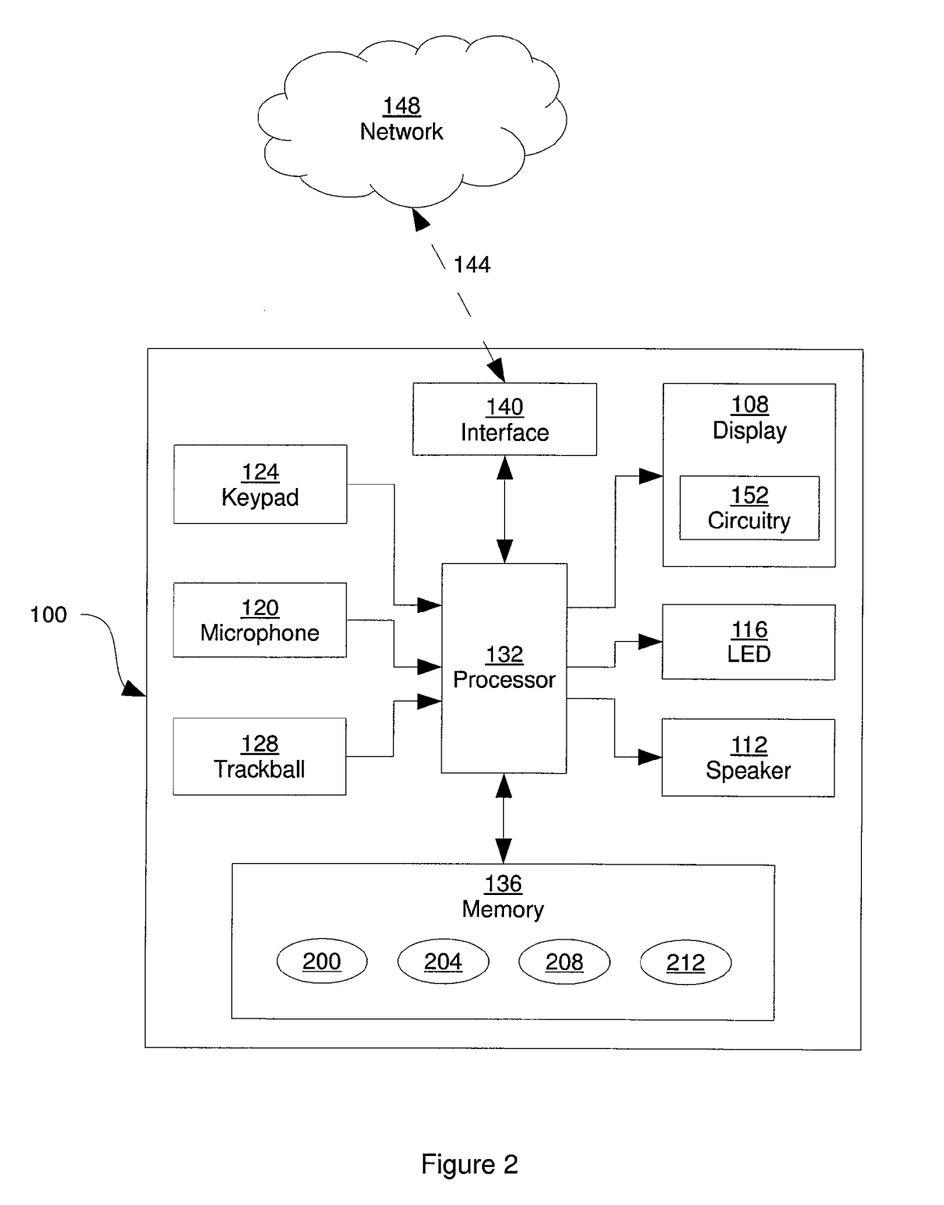
FIG. 2 depicts certain internal components of the mobile electronic device of FIG. 1, according to a non-limiting embodiment.

Referring now to FIG. 2, certain internal components of mobile electronic device 100 are shown. Mobile electronic device 100 includes a processor 132 interconnected with a computer readable storage (i.e. non-transitory) medium in the form of a memory 136. Memory 136 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Mobile electronic device 100 also includes a communications interface 140 interconnected with processor 132. Communications interface 140 allows mobile electronic device 100 to communicate with other computing devices via a link 144 and a network 148. Network 148 can include any suitable combination of wired and/or wireless networks, including but not limited to a Wide Area Network ("WAN") such as the Internet, a Local Area Network ("LAN"), cell phone networks, WiFi networks, WiMax networks and the like. Link 144 is compatible with network 148. In particular, link 144 can be a wireless link based on Global System for Mobile communications ("GSM"), General Packet Radio Service ("GPRS"), Enhanced Data rates for GSM Evolution ("EDGE"), and the third-generation mobile communication system (3G), Institute of Electrical and Electronic Engineers ("IEEE") 802.11 (WiFi) or other wireless protocols. It will be understood that link 144 can also include any base stations and backhaul links necessary to connect mobile electronic device 100 to network 148. It will be understood that communications interface 140 can therefore be selected for compatibility with link 144 as well as with network 148.

The above-mentioned input and output devices can also be seen in FIG. 2. Display 108 includes display circuitry 152 controllable by processor 132. It will now be apparent that display 108 can include a flat panel display (e.g. Liquid Crystal Display (LCD), plasma, and the like), a Cathode Ray Tube (CRT), and the like. Circuitry 152 can thus include any suitable combination of display buffers, transistors, electron beam controllers, LCD cells, plasma cells, phosphors, and the like.

The various components of mobile electronic device 100 are interconnected, for example via a communication bus. Mobile electronic device 100 can be powered by a battery (not shown), though it will be understood that in some non-limiting embodiments, mobile electronic device 100 can be supplied, in addition to or instead of the battery, with electricity by a wired connection to a wall outlet or other power source.

Mobile electronic device can maintain, in memory 136, a plurality of applications. Each application can comprise computer-readable instructions for execution by processor 132. Processor 132 can thus be configured to carry out various functions via execution of the applications. Among the functions carried out by processor 132 is the controlling of display 108 to generate representations of the applications, as will be discussed below in greater detail.

It will now be apparent that processor 132 can "multitask". That is, processor 132 can execute more than one application simultaneously. As will now be appreciated by those skilled in the art, processor 132 can be configured to manage the sharing and scheduling of its computing resources among multiple applications by execution of an operating system ("OS") (not shown). The operating system also comprises computer-readable instructions executable by processor 132. In some exemplary embodiments, as depicted in FIG. 2, memory 136 can store an address book application 200, a map application 204, a web browser application 208 and a messaging application 212. It will be appreciated that a wide variety of other applications are also possible in addition to, or instead of, the above-mentioned applications.

Figure 3:
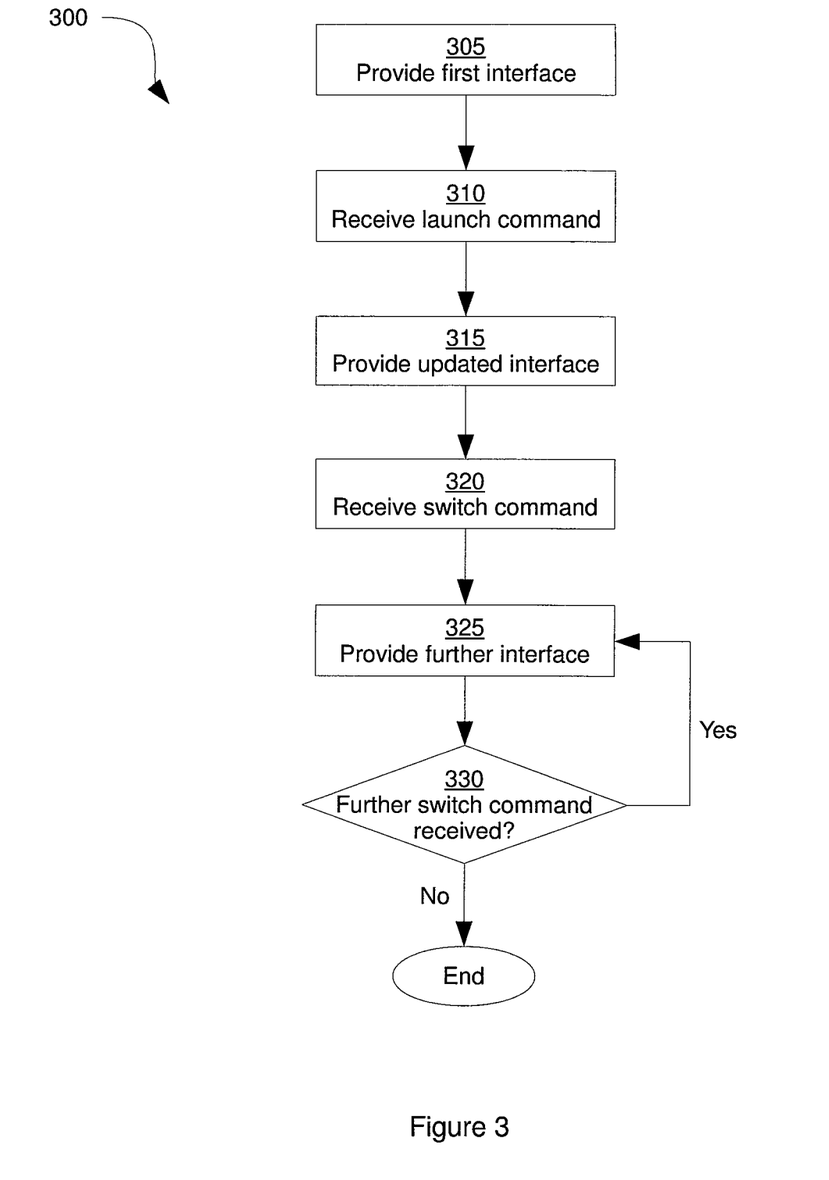
FIG. 3 depicts a method of controlling the display of the mobile electronic device of FIG. 1, according to a non-limiting embodiment.

Referring now to FIG. 3, a method 300 of controlling a display of a mobile electronic device is depicted. Method 300 will be described in connection with its performance on mobile electronic device, though it will be appreciated that method 300 can also be performed on other suitable devices.

Performance of method 300 begins at block 305, at which a first interface is provided on display 108. More specifically, processor 132 can be configured by execution of (for example) address book application 200 to control circuitry 152 of display 108 to generate a representation of address book application 200 on display 108. The performance of block 305, as will now be apparent to those skilled in the art, can be initiated in a variety of ways. For example, block 305 can be performed in response to the selection of an address book icon presented on display 108 in a home interface.

Figure 4:
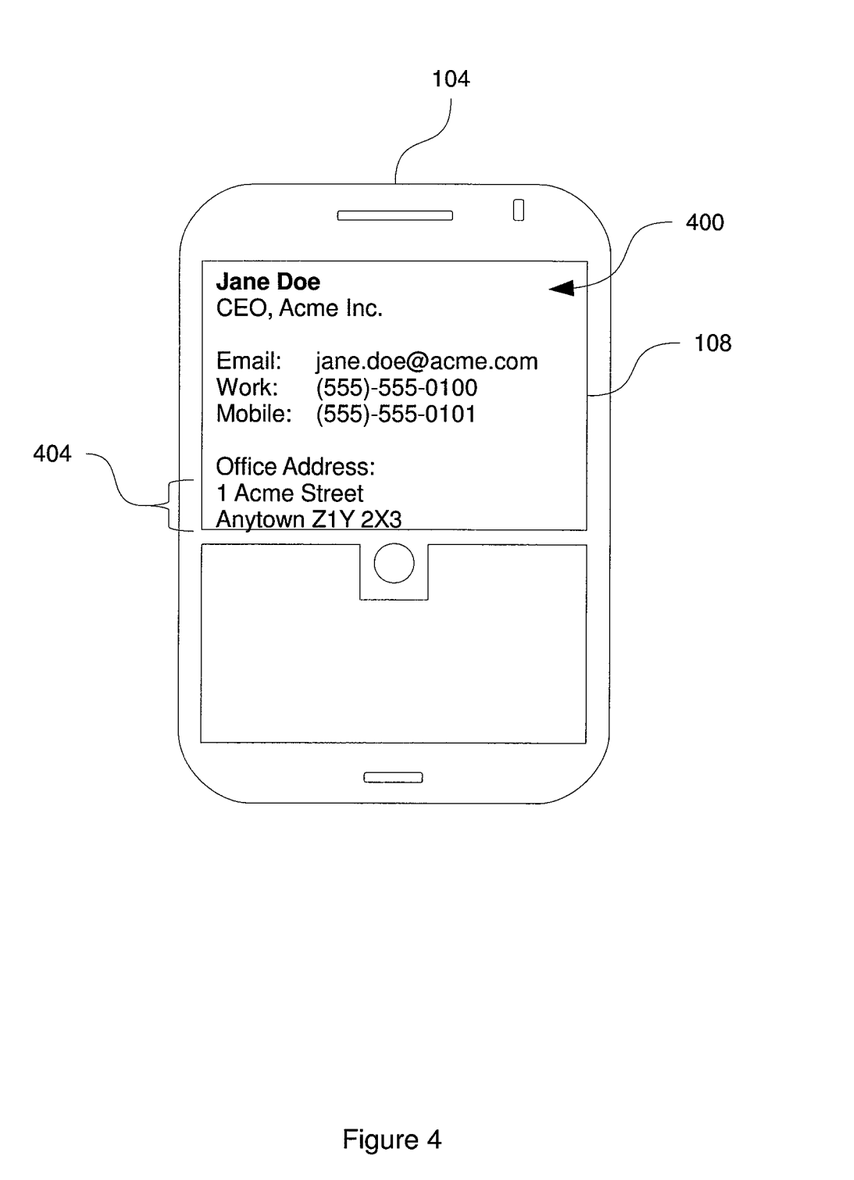
FIG. 4 depicts the mobile electronic device of FIG. 1 during a performance of the method of FIG. 3, according to a non-limiting embodiment.

Referring to FIG. 4, the above-described exemplary performance of block 305 is depicted. FIG. 4 depicts a first interface on display 108. The first interface comprises a representation 400 of address book application 200. In particular, representation 400 shows a contact record within address book application 200 for an individual named "Jane Doe". The contact record shown in representation 400 includes, among other elements, address information 404, as will be discussed below. Representation 400 is displayed at a default zoom level (that is, at 100% zoom). It will now be appreciated that zoom levels can be set on a per-application basis in mobile electronic device 104.

It will now be apparent to those skilled in the art that the first interface provided at block 305 of method 300 can occupy the entire, or substantially the entire, area of display 108. It will also be apparent, however, that this is not a necessity. Additional elements unrelated to address book application 200 can also be provided in the first interface in other embodiments (now shown). Such elements can include, without limitation, any suitable combination of a clock, a signal strength indicator and a battery level indicator.

Returning to FIG. 3, method 300 proceeds to block 310. At block 310 processor 132 can be configured to receive input data representing a launch command for a second application. As will now be apparent to those skilled in the art, such a launch command can be received by various mechanisms. In the present exemplary performance of method 300, performance of block 310 is as depicted in FIG. 5.

Figure 5:
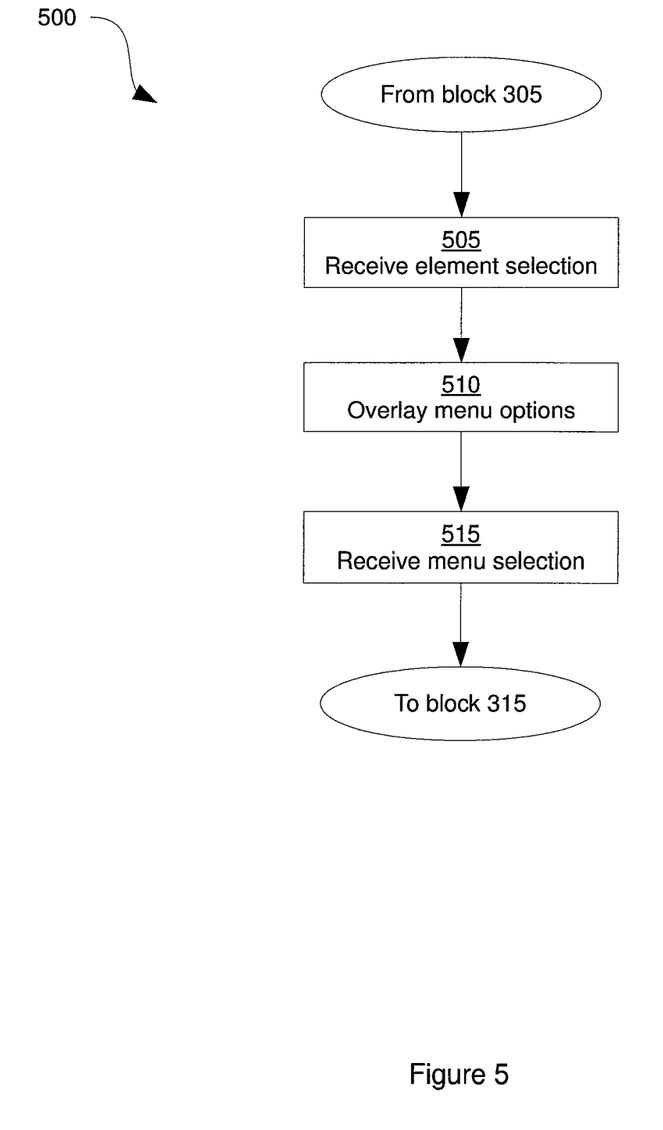
FIG. 5 depicts a method of receiving a launch command, according to a non-limiting embodiment.

FIG. 5 depicts a method 500 of receiving an application launch command as part of the performance of block 310 of method 300. Beginning at block 505, processor 132 can be configured to receive a selection of an element of representation 400 of address book application 200. Responsive to that selection, method 500 advances to block 510, at which menu options relating to the selected element are overlaid on the first interface on display 108.

Figure 6:
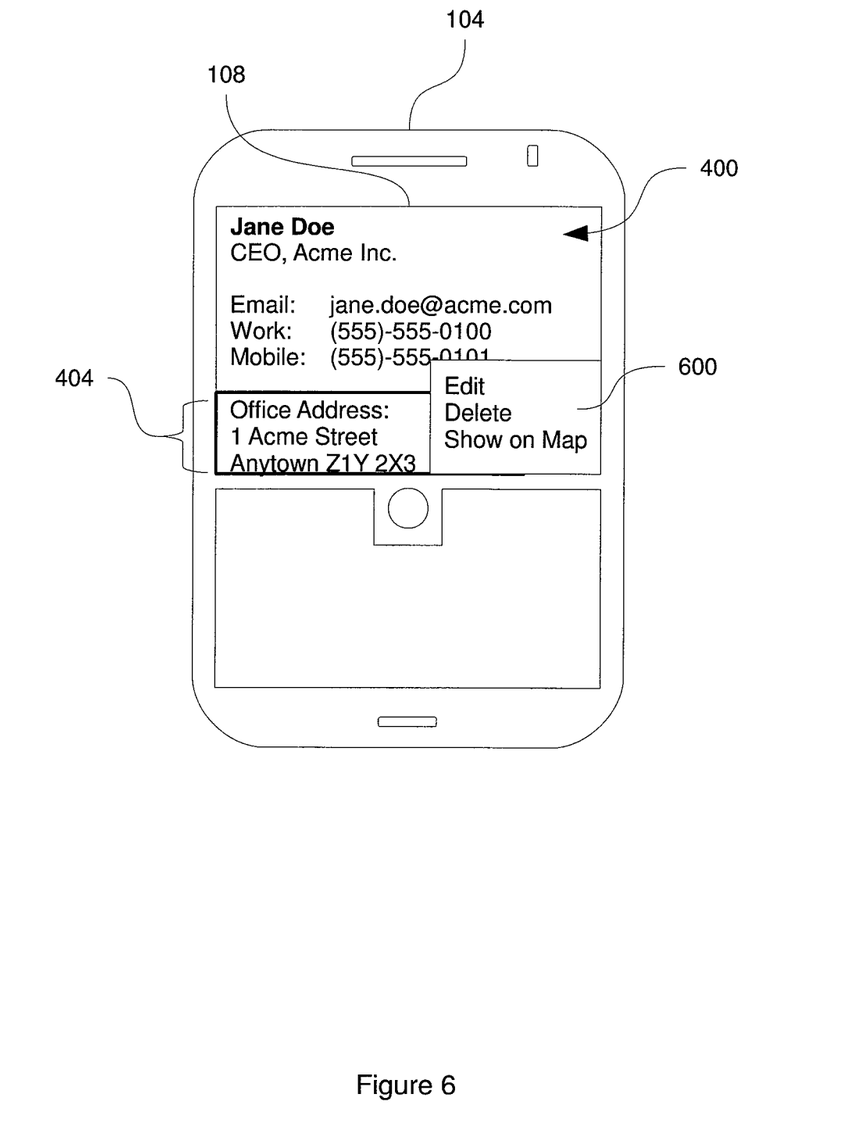
FIG. 6 depicts the mobile electronic device of FIG. 1 during a performance of the method of FIG. 5, according to a non-limiting embodiment.

FIG. 6 depicts the performance of blocks 505 and 510. In particular, in FIG. 6 address information 404 has been selected (as indicated by the bold outline around address information 404) at block 505. Input data indicating such a selection can be received by processor 132, for example, from trackball 128. It will now be apparent that trackball 128 can be used to scroll through the elements of the first interface and to select (e.g. via a depression of trackball 128) a highlighted element. Selections can be made in various other ways as well. For example, in some embodiments a touch screen can be used to detect contact on address information 404. As a result of the performance of block 510 following the selection of address information 404, menu options 600 have been provided on display 108 over representation 400. Menu options 600 are relevant to address information 404, and include a "show on map" option.

Returning to FIG. 5, method 500 proceeds to block 515, at which input data indicative of a selection of a menu option is received at processor 132. In the present exemplary performance of method 500, input data is received at processor 132 indicating that the "show on map" option seen in FIG. 6 has been selected. The selected option is associated with a second application—in the present exemplary performance, with map application 204. The receipt of a selection of the "show on map" menu option at block 515 is thus equivalent to receiving a launch command for map application 204.

Returning to FIG. 3, having received a launch command for a second application (e.g. map application 204), processor 132 can be configured, at block 315, to provide an updated interface on display 108. That is, processor 132 can be configured to control circuitry 152 to generate the updated interface on display 108. The updated interface includes updated representations of the first application (in this exemplary performance, address book application 200) and of the second application (in this exemplary performance, map application 204). Such an updated interface is shown in FIG. 7.

Figure 7:
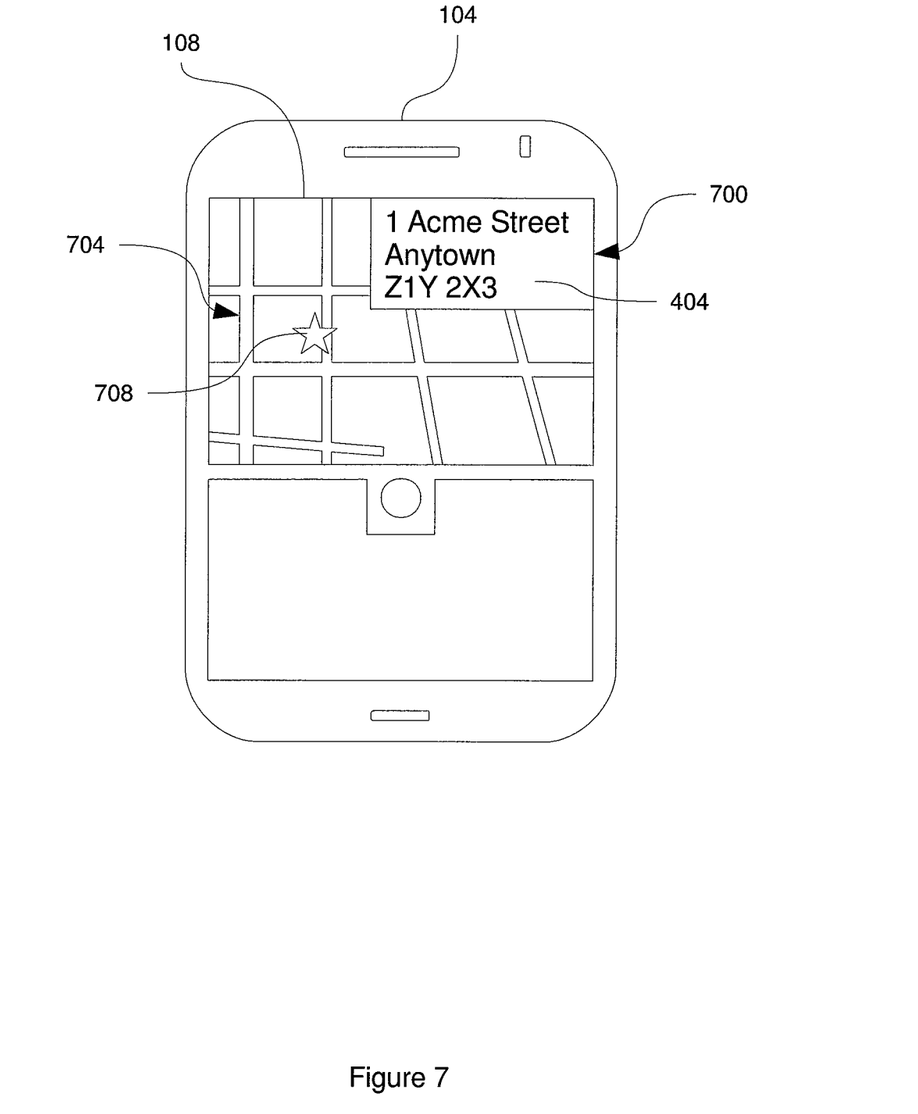
FIG. 7 depicts the mobile electronic device of FIG. 1 during a performance of the method of FIG. 3, according to a non-limiting embodiment.

The updated interface shown in FIG. 7 includes an updated representation 700 of address book application 200, and an updated representation 704 of map application 204. Updated representation 700 of address book application 200 is in a read-only, or inactive, state (also referred to as a non-editable state)—that is, the elements (such as address information 404) of updated representation 700 cannot be selected or otherwise interacted with by way of input received from any of the input devices of mobile electronic device 104. Updated representation 704 of map application 204 is in an active state (i.e. editable or read/write state). Thus, elements of updated representation 704 can be selected and altered via receipt of input data from, for example, trackball 128. For instance, the map indicating (by way of identifier 708) the location specified by address information 404 can be moved and zoomed in or out by receipt of input data at processor 132, which can cause processor 132 to control display 108 to alter the appearance of representation 704.

It will now be apparent to those skilled in the art that the inactive representation 700 can occupy a first portion of the area of display 108, while the active representation 704 can occupy a second portion of the area of display 108. In the present exemplary embodiment, representation 700 occupies approximately 25% of the display area, while representation 704 occupies approximately 75% of the display area. The active and inactive representations can occupy different portions of the display area than 75% and 25% respectively. For example, in some embodiments the active representation can occupy 85% and the inactive representation can occupy 15%. Other variations are also contemplated, and will now occur to those skilled in the art. While in the embodiment illustrated in FIG. 7, updated representations 700 and 704 together occupy the entire area of display 108, in some embodiments (not shown), the sum of the display area occupied by updated representations 700 and 704 together can be less than 100%. In general, the first portion occupied by the inactive representation is smaller than the second portion occupied by the active representation.

It will also be apparent from FIG. 7 that updated representation 700 can be presented at a greater zoom level than representation 400 of address book application 200. In this exemplary embodiment, the zoom level of updated representation 700 can be approximately 150%, though it will be appreciated that any zoom level greater than that of representation 400 can be used. Processor 132 can be configured to provide such a zoom level increase by, for example, obtaining address information 404 from memory 136 and increasing the font size of address information 404 prior to transmitting address information 404 to circuitry 152 of display 108 for generating updated representation 700. Further, updated representation 700 is centered on address information 404, whose selection lead to the launching of map application 204. In the present exemplary embodiment, address information 404 is in fact the only element of address book application 200 presented in updated representation 700. Processor 132 can be configured to generate updated representation 700 by implementing any suitable combination of the above-mentioned features (zoom, centering and omission of other, non-selected elements).

Returning to FIG. 3, following the performance of block 315, method 300 proceeds to block 320. At block 320, processor 132 can be configured to receive a command to "switch" the first and second applications. In some embodiments, the switch command can be received from keypad 124. For example, the combined depression of a pair of keys such as an "Alt" key and a "back" key can result in input data indicating a switch command being received at processor 132. Other mechanisms for receiving a switch command will also occur to those skilled in the art. For example, mobile electronic device can include an additional input device in the form of a switch button (not shown). In other exemplary embodiments, the switch command can be received automatically in response to selection of a menu option on display 108 by trackball 128. For example, selection of a menu option in map application 204 for adding a mapped address to the contacts maintained by address book application 200 can trigger a switch command in addition to the necessary command or commands required to add the address to contacts. It is contemplated that the conditions which lead to receipt of a switch command at block 320 can be configurable by way of settings maintained by mobile electronic device 104. In some embodiments, for example, the combination of keys (such as "Alt" and "back" as mentioned above) can be specified in such configurable settings. In other exemplary embodiments, notification profiles which govern ring tones, volume and the like can also include switch command settings. In still other exemplary embodiments, switch command behaviour can be set based on the application or applications being executed by processor 132. Thus, for example, execution of web browser application 208 can provide for the receipt of a switch command when a particular key of keypad 124 is depressed, while execution of messaging application 212 can provide for the receipt of a switch command when a particular menu option is selected. It is also contemplated that various combinations of the above-mentioned embodiments can be implemented.

Figure 8:
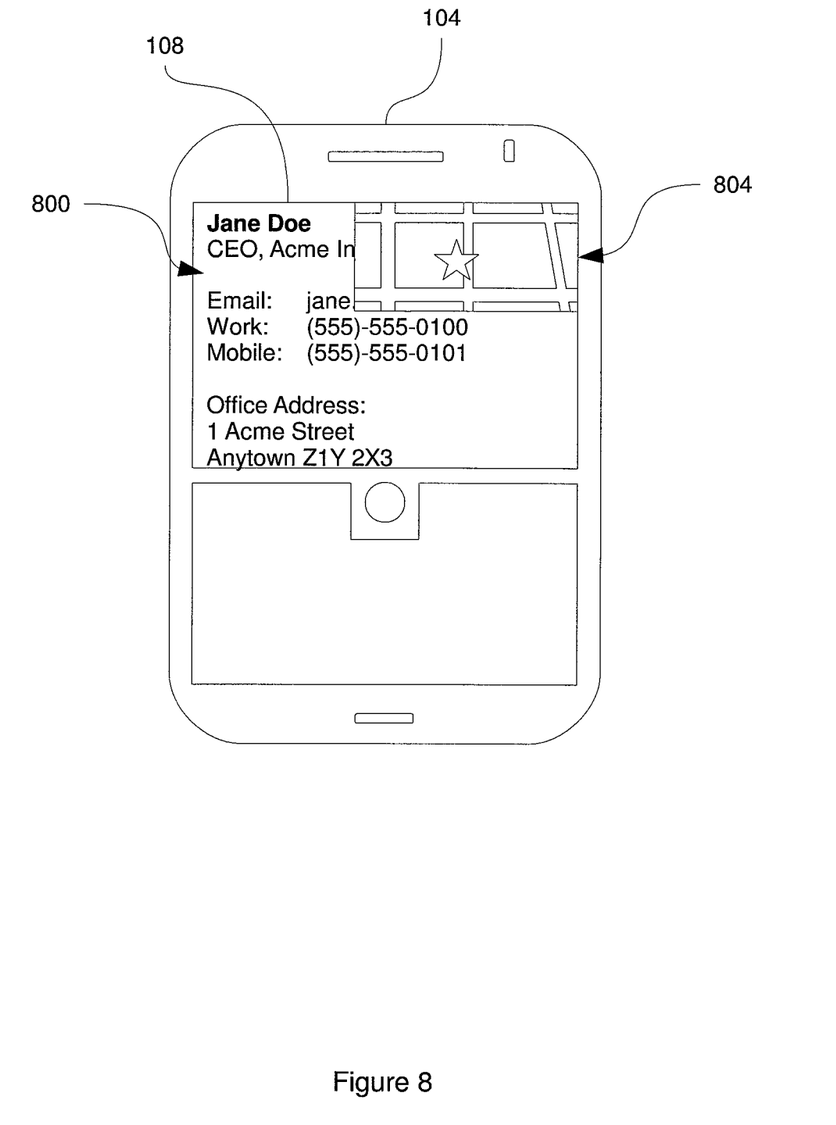
FIG. 8 depicts the mobile electronic device of FIG. 1 during a performance of the method of FIG. 3, according to a non-limiting embodiment.

Having received the switch command at block 320, processor 132 can be configured to perform block 325. At block 325, processor 132 can be configured to control display 108 to generate a further interface including further representations of address book application 200 and map application 204. In general, the switch command is a command to generate a new interface in which the application currently occupying the smaller, inactive portion of display 108 is made to occupy the larger, active portion and vice versa. Thus, referring to FIG. 8, a further interface as generated at block 325 is shown, including a further representation 800 of address book application 200 and a further representation 804 of map application 204. As can be seen in FIG. 8, further representation 800 occupies the second larger portion of display 108. Address book application 200 is thus the active, or editable, application in this interface, while map application 204, represented in the first smaller portion of display 108, is the inactive or read-only application. The positions of address book application 200 and map application 204 have therefore been switched in the further interface. It will be noted that further representation 804 is generated at the same zoom level as in FIG. 7. As mentioned earlier, the change in zoom level is not a necessity when transitioning an application from active to inactive status on display 108.

As indicated in FIG. 3, the performance of block 325 can be repeated as desired. In particular, following performance of block 325, processor 132 can be configured to determine if a further switch command has been received. When the determination at block 330 is negative, method 300 can terminate. When the determination is positive, method 300 can return to block 325 and provide another updated interface as described earlier. At any time during the performance of method 300, processor 132 can also be configured to receive input data representing an exit command. When such an exit command is received, (for example, from keypad 124) processor 132 can be configured to cease execution of the application represented in the second (i.e. larger, active) portion of display 108 and automatically updated the interface on display 108 to include only a representation of the previously inactive application.

It will be appreciated that the above methods and their variants can be performed on the above-described apparatus or on other suitable apparatus. While exemplary address book and map applications are discussed herein, methods 300 and 500 can also be performed in connection with any other suitable applications. For example, in some embodiments web browser application 208 and messaging application 212 can be executed as part of the performance of the methods. In such embodiments, a word displayed as part of a representation of messaging application 212 (e.g. a word appearing in an email message) can be selected, and web browser application 208 can be launched in order to retrieve a definition for the selected word. Still other combinations of applications will occur to those skilled in the art.

Those skilled in the art will appreciate that in some embodiments, the functionality of one or more of applications 200, 204, 208, 212 may be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. A method of controlling a display of a mobile electronic device, the method comprising:
   providing a first interface on the display, the first interface comprising a representation of a first application at a default zoom level;
   receiving a command to launch a second application; and,
   responsive to receiving the launch command, providing an updated interface on the display, the updated interface comprising updated representations of the first application and the second application;
   wherein the updated representation of the first application is inactive, such that selection of elements of the updated representation of the first application is disabled, and occupies a first portion of the area of the display, and the updated representation of the second application is active and occupies a second portion of the display area, the second portion being larger than the first portion;
   receiving a switch command;
   in response to the switch command, providing a further interface on the display, the further interface comprising further representations of the first and second applications;
   wherein the further representation of the first application is active and occupies the second portion, and wherein the further representation of the second application is inactive and occupies the first portion.

2. The method of claim 1, wherein the first and second portions together occupy the entire display area.

3. The method of claim 2, wherein the first portion occupies approximately 25% of the display area and wherein the second portion occupies approximately 75% of the display area.

4. The method of claim 1, further comprising:
   receiving a selection of an element of the representation of the first application prior to receiving the launch command.

5. The method of claim 4, further comprising:
   providing at least one menu option on the display, wherein receiving the launch command comprises receiving a selection of the at least one menu option.

6. The method of claim 4, wherein the updated representation of the first application is centered on the selected element.

7. The method of claim 1, wherein the updated representation of the first application is at a zoom level greater than the default zoom level.

8. The method of claim 1, wherein the first application is an address book application, and wherein the second application is a map application.

9. A mobile electronic device, comprising:
   a display;
   a memory for maintaining a first application and a second application; and,
   a processor interconnected with the display and the memory, the processor configured to control the display for providing a first interface, the first interface comprising a representation of the first application at a default zoom level;
   the processor further configured to receive a command to launch the second application;
   the processor further configured, responsive to receiving the launch command, to control the display for providing an updated interface, the updated interface comprising updated representations of the first application and the second application;
   wherein the updated representation of the first application is inactive, such that selection of elements of the updated representation of the first application is disabled, and occupies a first portion of the area of the display, and the updated representation of the second application is active and occupies a second portion of the display area, the second portion being larger than the first portion;
   the processor being further configured to receive a switch command, and to control the display for providing a further interface, the further interface comprising further representations of the first and second applications;
   wherein the further representation of the first application is active and occupies the second portion, and wherein the further representation of the second application is inactive and occupies the first portion.

10. The mobile electronic device of claim 9, wherein the first and second portions together occupy the entire display area.

11. The mobile electronic device of claim 10, wherein the first portion occupies approximately 25% of the display area and wherein the second portion occupies approximately 75% of the display area.

12. The mobile electronic device of claim 9, the processor being further configured to receive a selection of an element of the representation of the first application prior to receiving the launch command.

13. The mobile electronic device of claim 12, the processor being further configured to control the display for providing at least one menu option; the processor being further configured to receive the launch command by receiving a selection of the at least one menu option.

14. The mobile electronic device of claim 12, wherein the updated representation of the first application is centered on the selected element.

15. The mobile electronic device of claim 9, wherein the updated representation of the first application is at a zoom level greater than the default zoom level.

16. The mobile electronic device of claim 9, further comprising a switch button; the processor being configured to receive the switch command responsive to a depression of the switch button.

17. The mobile electronic device of claim 9, wherein the first application is an address book application, and wherein the second application is a map application.

18. A non-transitory computer readable storage medium having computer-readable instructions embodied therein for execution by a processor, the computer-readable instructions implementing a method, the method comprising:

providing a first interface on the display, the first interface comprising a representation of a first application at a default zoom level;

receiving a command to launch a second application; and,     responsive to receiving the launch command, providing an updated interface on the display, the updated interface comprising updated representations of the first application and the second application;

wherein the updated representation of the first application is inactive, such that selection of elements of the updated representation of the first application is disabled, and occupies a first portion of the area of the display, and the updated representation of the second application is active and occupies a second portion of the display area, the second portion being larger than the first portion;

receiving a switch command;

in response to the switch command, providing a further interface on the display, the further interface comprising further representations of the first and second applications;

wherein the further representation of the first application is active and occupies the second portion, and wherein the further representation of the second application is inactive and occupies the first portion.

* * * * *